United States Patent
Langer et al.

(10) Patent No.: US 8,256,967 B2
(45) Date of Patent: Sep. 4, 2012

(54) BEARING ARRANGEMENT OF A WHEEL HUB OF A MOTOR VEHICLE DRIVABLE BY A ROTATING JOINT

(75) Inventors: Roland Langer, Schwanfeld (DE); Peter Niebling, Bad Kissingen (DE); Ernst Masur, Untereuerheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 729 days.

(21) Appl. No.: 12/304,374

(22) PCT Filed: Jun. 28, 2007

(86) PCT No.: PCT/DE2007/001158
§ 371 (c)(1),
(2), (4) Date: Dec. 11, 2008

(87) PCT Pub. No.: WO2008/003292
PCT Pub. Date: Jan. 10, 2008

(65) Prior Publication Data
US 2009/0202186 A1 Aug. 13, 2009

(30) Foreign Application Priority Data
Jul. 1, 2006 (DE) .......................... 10 2006 030 478

(51) Int. Cl.
*F16C 13/00* (2006.01)
*F16C 35/00* (2006.01)

(52) U.S. Cl. ....................................... 384/544; 384/589

(58) Field of Classification Search .................. 384/537, 384/544, 559, 586, 589, 598
See application file for complete search history.

(56) References Cited

U.S. PATENT DOCUMENTS

| | | | |
|---|---|---|---|
| 4,460,058 A * | 7/1984 | Welschof et al. .............. 180/258 |
| 4,893,960 A * | 1/1990 | Beier et al. ....................... 403/24 |
| 5,536,098 A * | 7/1996 | Schwarzler .................... 403/259 |
| 5,974,665 A * | 11/1999 | Frielingsdorf et al. .. 29/894.361 |
| 6,146,022 A * | 11/2000 | Sahashi et al. ................. 384/544 |
| 6,318,533 B1 * | 11/2001 | Krisher ....................... 192/69.41 |
| 6,485,188 B1 * | 11/2002 | Dougherty .................... 384/589 |
| 6,676,226 B2 * | 1/2004 | Hahn .......................... 301/105.1 |
| 6,821,208 B2 * | 11/2004 | Krude et al. ................... 384/544 |
| 6,851,865 B2 * | 2/2005 | Nomura et al. ................ 384/544 |
| 6,918,637 B2 * | 7/2005 | Hahn .......................... 301/105.1 |
| 7,597,405 B2 * | 10/2009 | Langer et al. ................. 384/562 |

FOREIGN PATENT DOCUMENTS

| | | |
|---|---|---|
| DE | 3138366 A1 | 4/1983 |
| DE | 36 36 243 A | 5/1988 |
| JP | 08 200384 A | 8/1996 |

* cited by examiner

*Primary Examiner* — Marcus Charles
(74) *Attorney, Agent, or Firm* — Lucas & Mercanti, LLP; Klaus P. Stoffel

(57) ABSTRACT

The bearing arrangement for a connection of a wheel hub to a rotating joint. A face of an axle stub of the wheel hub with a spur gearing element is non-rotatably connected to a corresponding spur gearing element of a joint body of the rotating joint. The spur gearing elements are disposed at least partially radially and axially beneath the roller bearing. The inner bearing ring is connected to a means for the axial tolerance compensation between the inner bearing ring and the countersurface of the joint body.

7 Claims, 5 Drawing Sheets

BEARING ARRANGEMENT OF A WHEEL HUB OF A MOTOR VEHICLE DRIVABLE BY A ROTATING JOINT

CROSS-REFERENCE TO RELATED APPLICATIONS

This application is a 371 of PCT/DE2007/001158 filed Jun. 28, 2007, which in turn claims the priority of DE 10 2006 030 478.0 filed Jul. 1, 2006, the priority of both applications is hereby claimed and both applications are incorporated by reference herein.

FIELD OF THE INVENTION

The invention relates to a bearing arrangement of a wheel hub of a motor vehicle drivable by a rotating joint, wherein the wheel hub, which is connected to a wheel flange, and the rotating joint, which is connected to a drive shaft, are non-rotatably connected to each other by means of a serration, and comprising a double-row roller bearing which is mounted on the wheel hub and has at least one separate bearing inner ring, an end face of which protrudes axially beyond the end of an axle stub of the wheel hub, wherein the roller bearing is axially prestressed via a counter-surface of a joint body of the rotating joint, the surface acting on the end face of the separate bearing inner ring.

BACKGROUND OF THE INVENTION

A bearing arrangement of this type of a wheel hub of a motor vehicle drivable by a rotating joint is known from DE 42 10 461 C2. In the case of this arrangement, the non-rotatable connection of the wheel hub and rotating joint is facilitated by a threaded journal having a shaft serration which engages with a appropriately configured axial inner serration in the axle stub of the wheel hub. The counter-surface of the joint body of the joint shaft acts in a twofold manner on the bearing inner ring protruding beyond the axle stub of the wheel hub, namely as a result of the fact that an end side of the counter-surface presses onto an end side of the axially protruding bearing inner ring and as a result of the fact that an axial surface of the counter-surface supports the protruding part of the bearing inner ring. The aim of this arrangement is to prevent deformation effects, in particular deformation effects of the type which act on the bearing inner ring as a consequence of bending moments.

An advantage of an arrangement of this type is a relatively compact and short construction of the wheel hub/rotating joint unit, as at least some of the joint body is received axially in the wheel hub. An increasingly desirable shift of the joint shaft center point from the outer ball joint as far as possible in the direction of the vehicle exterior therefore takes place. However, the configuration of the serration as a shaft serration must be regarded as a drawback, as with such substantially axially extending serration the setting of the correct spacing of the components from one another appears problematic. Furthermore, the counter-surface of the joint body acting on the end side of the bearing inner ring makes precise setting of the necessary prestress of the bearing inner ring difficult, as bracing of the wheel bearing unit to the joint shaft gives rise to the problem of the overdetermination for the desired axial freedom of play of the serration and wheel bearing air by way of two axial or radial abutment points in the region of the abutment of the joint shaft against the bearing inner ring.

Other bearing arrangements of a wheel hub of a motor vehicle drivable by a rotating joint are known. These arrangements do not have these problems but are capable of improvement in other respects.

DE 31 16 720 C1 discloses a bearing arrangement in which the entire inner ring is formed in one piece on the wheel hub, so that the setting of the prestress and the fixing of a separate bearing inner ring are immaterial there. An end serration, which corresponds to an end serration in the joint outer part of the joint body, is formed into the end side, directed toward the joint body, of the axle stub of the wheel hub, thus ensuring a simple, releasable fastening of these components. An arrangement of this type is not suitable for bearing arrangements comprising multipart inner rings. Although this configuration is to afford a low axial overall length, this length is still too great for current-day demands for increasingly compact vehicles with less and less available installation space.

A similar arrangement is known from DE 36 04 630 C2 in which the axially terminal end serrations of the wheel hub and rotating joint are pressed in an oscillating manner. This arrangement also takes up a relatively large amount of axial installation space.

DE 36 36 243 C2 discloses a wheel bearing/constant velocity joint unit comprising a double-row bearing comprising at least one bearing inner ring which is formed separately from the wheel hub and is axially held or braced by a reshaped collar formed on the wheel hub. The collar can in this case be provided directly or indirectly via an intermediate part for mounting the bearing inner ring. The reshaping method used is in particular cold reshaping. In the case of one embodiment of said document, provision is made for an end or oblique serration to be formed into the reshaped collar, which radially outwardly overlaps the bearing inner ring, of the wheel hub, wherein the end or oblique serration can be directly, non-rotatably connected to a joint component, in particular the joint outer part. A configuration of this type is to allow an extensive, radially oriented end serration or slightly conical oblique serration to be provided independently of the type of bearing configuration, wherein according to a appropriate method the oblique or end serration is impressed into the material at the same time during manufacture of the collar.

In the case of DE 36 36 243 C2, another configuration provides for the formation of an oblique or end serration on an annular projection which radially outwardly increases the size of the bearing inner ring, wherein the end or oblique serration can be directly, non-rotatably connected to a joint component, in particular the joint outer part, and in which the bearing inner ring comprises engagement means with which the reshaped collar engages in a form-fitting manner. According to this, the separate bearing inner ring, which can be provided with an enlarged end face, takes part in the transmission of torque from the hub to the rotating joint.

In the case of this solution, an axial serration is applied to a roller-riveted collar by material reshaping. This roller-riveted collar with serration requires additional installation space in the axial direction. This causes an increase in the size of the bending angle of the joint shaft and thus has a negative influence on the service life of the joint shaft and the steering lock of the vehicle.

Finally, U.S. Pat. No. 6,146,022 discloses a bearing arrangement of a wheel hub of a motor vehicle drivable by a rotating joint, which is in itself very advantageous with regard to a low installation length. The axle stub of the wheel hub and an end side of the joint body have mutually corresponding end serrations, the end serrations being disposed roughly centrally below the raceways of the bearing arrangement. In this case, one inner raceway is formed in the wheel hub and the other inner raceway in the jacket of the joint body. As a result of the integration of the rolling body raceway into the joint body, the installation space required axially is reduced. The center point of the joint body therefore migrates further in the direction of the vehicle exterior. Nevertheless, in the case of an arrangement of this type, the necessary prestress of the rolling bodies of the bearing arrangement is difficult to set.

OBJECT OF THE INVENTION

The invention is based on the object of providing a bearing arrangement which eliminates the described drawbacks. In particular, it is the object of the invention to provide an axially short unit consisting of the wheel hub, bearing arrangement and rotating joint, in which the setting of the prestress of the bearing is simple to bring about.

SUMMARY OF THE INVENTION

The invention is based on the finding that the object set can be achieved in a surprisingly simple manner in that the axle stub of the wheel hub and the joint body of the rotating joint each have an end serration, wherein the end serrations are disposed radially and axially beneath the bearing arrangement. Furthermore, the object is achieved in that the bearing inner ring is connected to a means for axial tolerance compensation between the bearing inner ring and the support surface of the joint body.

The invention therefore starts from a bearing arrangement of a wheel hub of a motor vehicle drivable by a rotating joint, wherein the wheel hub, which is connected to a wheel flange, and the rotating joint, which is connected to a drive shaft, are non-rotatably connected to each other by means of a serration, and comprising a double-row roller bearing which is arranged on the wheel hub and has at least one separate bearing inner ring, an end face of which protrudes axially beyond the end of an axle stub of the wheel hub, wherein the roller bearing is axially prestressed via a counter-surface of a joint body of the rotating joint, the surface acting on the end face of the separate bearing inner ring. In addition, provision is made for an end face of the axle stub of the wheel hub to comprise an end serration which can be non-rotatably connected to a corresponding end serration of the joint body of the rotating joint, wherein the end serrations are disposed at least partially radially and axially beneath the roller bearing, and for the bearing inner ring to be connected to a means for axial tolerance compensation between the bearing inner ring and the counter-surface of the joint body.

As a result of this construction, it is advantageously achieved that the connecting point provided of the axial serration or the end serrations is arranged as far as possible below the ball raceways, thus producing an axially short unit consisting of the wheel hub and rotating joint.

The problem, resulting during the bracing of the wheel bearing unit to the joint shaft, of the overdetermination for the desired axial freedom of play of the serration and wheel bearing air by way of two axial abutment points in the region of the serration and the abutment of the joint shaft against the bearing inner ring is solved by the means for axial tolerance compensation between the bearing inner ring and the support surface of the joint body. In this case, these means can be provided by a appropriate configuration of the parts in question, namely of the bearing inner ring and/or abutment surface of the joint body, or by appropriate elastically/plastically deformable intermediate parts.

There is therefore provided in a surprisingly simple manner a bearing arrangement which consists of individual components, some of which are known per se, and is not only slender or axially short but, in addition, allows simple and exact setting of the bearing prestress in a completely novel manner.

In developments of the invention, the means for tolerance setting can be configured in a broad range of ways, thus producing a number of novel possible configurations in the field of the design of wheel hub/joint shaft connections.

In particular, provision may be made for the means for axial tolerance compensation between the bearing inner ring and the counter-surface of the joint body to be embodied as an axial undercut in the form of an annular groove in an end side of the joint body.

In other practical developments, provision may be made for the means for axial tolerance compensation to be a spring element which is disposed between the counter-surface of the joint body and an end face of the bearing inner ring.

This configuration can also be supplemented by embodying the spring element as a shaft washer, an omega bush or a plate spring.

Also particularly advantageous is a development of the invention which is distinguished in that the means for axial tolerance compensation is formed by another undercut, wherein this undercut is formed into the axle stub in such a way that an axial spacing remains between an axially inner bearing inner ring and an axially inner end face of the axially outer bearing inner ring.

It is also within the scope of the invention to provide for the formation of the means for axial tolerance compensation by a cross-sectional tapering of the axially outer bearing inner ring in the region of its axially inner end face.

Finally, particularly advantageous is a configuration of the invention which is distinguished in that the end serration is embodied as a Hirth serration with radially extending teeth having a number of from 20 to 80, in particular 25 to 50.

BRIEF DESCRIPTION OF THE DRAWINGS

The invention will be described hereinafter in greater detail with reference to the appended drawings, in which.

DETAILED DESCRIPTION OF THE DRAWINGS

Figure 1:
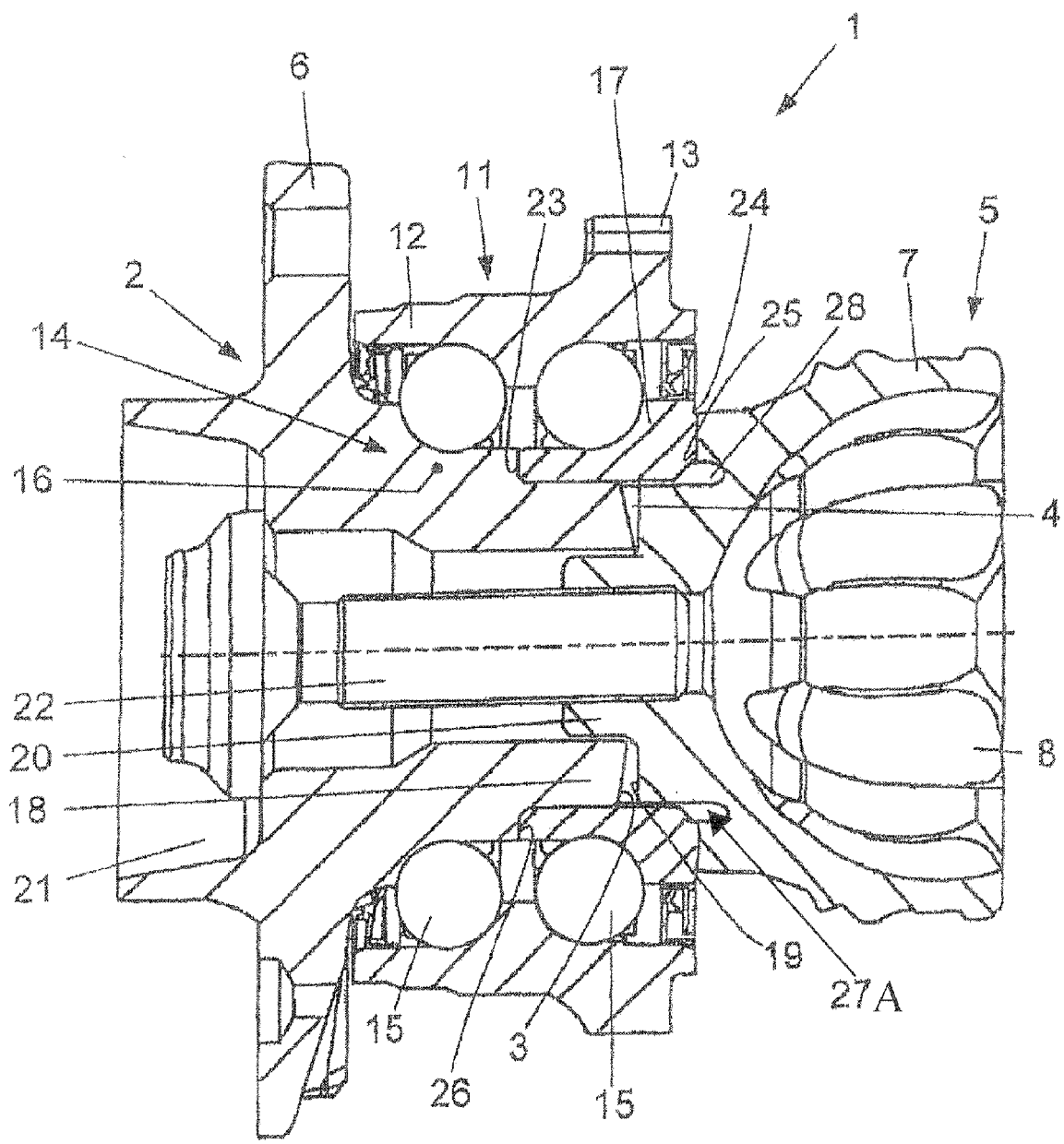
FIG. 1 is a longitudinal section through a first exemplary embodiment of a bearing arrangement according to the invention.

FIGS. 1 to 5 are each a longitudinal section of a bearing arrangement 1, wherein the same reference numerals are used hereinafter to denote like components.

FIG. 1 accordingly shows a first exemplary embodiment of a bearing arrangement 1 comprising a wheel hub 2 of a motor vehicle (not shown). The wheel hub 2 is connected to a joint 5 known per se via an end serration 3, 4. In addition, the wheel hub 2 has at an axial end a wheel flange 6 for receiving a vehicle wheel (not shown).

The joint 5 has in a manner known per se a bell-shaped outer joint body 7, formed in the inside of which are raceways 8 for joint balls also shown here. A joint inner part, which is also provided with ball raceways and is connected to a drive shaft, can be inserted into the outer joint body 7.

A double-row roller bearing 11, in the form of an oblique ball bearing, is arranged on the wheel hub 2 in an O-shaped arrangement. The roller bearing 11 comprises an outer ring 12, formed integrally with which is a fastening flange 13 for a brake disk, and also an inner ring 14 for receiving rolling bodies. Bearing balls 15, which serve as rolling bodies, are arranged between the outer ring 12 and inner ring 14. The inner ring 14 consists of two bearing inner rings 16 and 17, an axially outer bearing inner ring 16 being formed in one piece on the wheel hub 2, while an axially inner bearing inner ring 17 is a separate component which has been slid onto an axle stub 18 of the wheel hub 2.

An end serration 4, which is in engagement with the corresponding end serration 3 of the axle stub 18, is provided on an axially outer end face 19 of the outer joint body 7. This end serration 3, 4 serves to transmit a torque from the rotating joint 5 to the wheel hub 2. The end serration 3, 4 is located radially and axially beneath the roller bearing 11, roughly centrally below the axially inner bearing inner ring 17.

Formed in the center of the end face 19 of the outer joint body 7 is a projection 20 comprising a hole provided with an axial serration. A bolt 22, which can be accessed from a central hole 21 in the wheel hub 2, is screwed into this hole. This central hole 21 is accessible through a center hole (not shown) in the vehicle wheel, so that detachment or mounting of the drive shaft (not shown) with the rotating joint 5 is possible from the vehicle exterior.

The axially inner bearing inner ring 17 has an axially outer end face 23 and an axially inner end face 24 which is directed toward and rests against a counter-surface 25 of the joint body 7. During tightening of the bolt 22, the wheel hub 2 and the joint body 7 are moved axially toward each other until the end serrations 3, 4 are in engagement with each other. At the same time, the counter-surface 25 of the joint body 7 presses against the axially inner end face 24 of the bearing inner ring 17 and thus presses the bearing inner ring 17 against an axial abutment surface 26 of the axle stub 18.

As the end serration 3, 4 is located axially relatively far below the roller bearing 11, bracing of the wheel hub 2 to the rotating joint 5 gives rise to the problem of the overdetermination for the desired axial freedom of play of the serration and wheel bearing air by way of two axial abutment points in the region of the end serration 3, 4 and the abutment of the counter-surface 25 against the end face 24 of the bearing inner ring 17.

To eliminate this problem, the axially inner bearing inner ring 17 is connected to a means 27A for axial tolerance compensation between this bearing inner ring 17 and the counter-surface 25 of the joint body 7. This means 27A for axial tolerance compensation is, in the case of the embodiment according to FIG. 1, an axial undercut in the form of an annular groove 28 in the counter-surface 25 or in the end face 19 of the joint body 7. The annular groove 28 affords elastic deformability in the region of the counter-surface 25, so that during assembly there is initially in the region of the end serration 3, 4 play-free abutment of the axle stub 18 against the joint body 7. The required tolerance compensation for secure axial bracing of the bearing inner ring 17 is ensured by the elastic deformability of the joint body 7 in the region of the joint body abutment.

Figure 2:
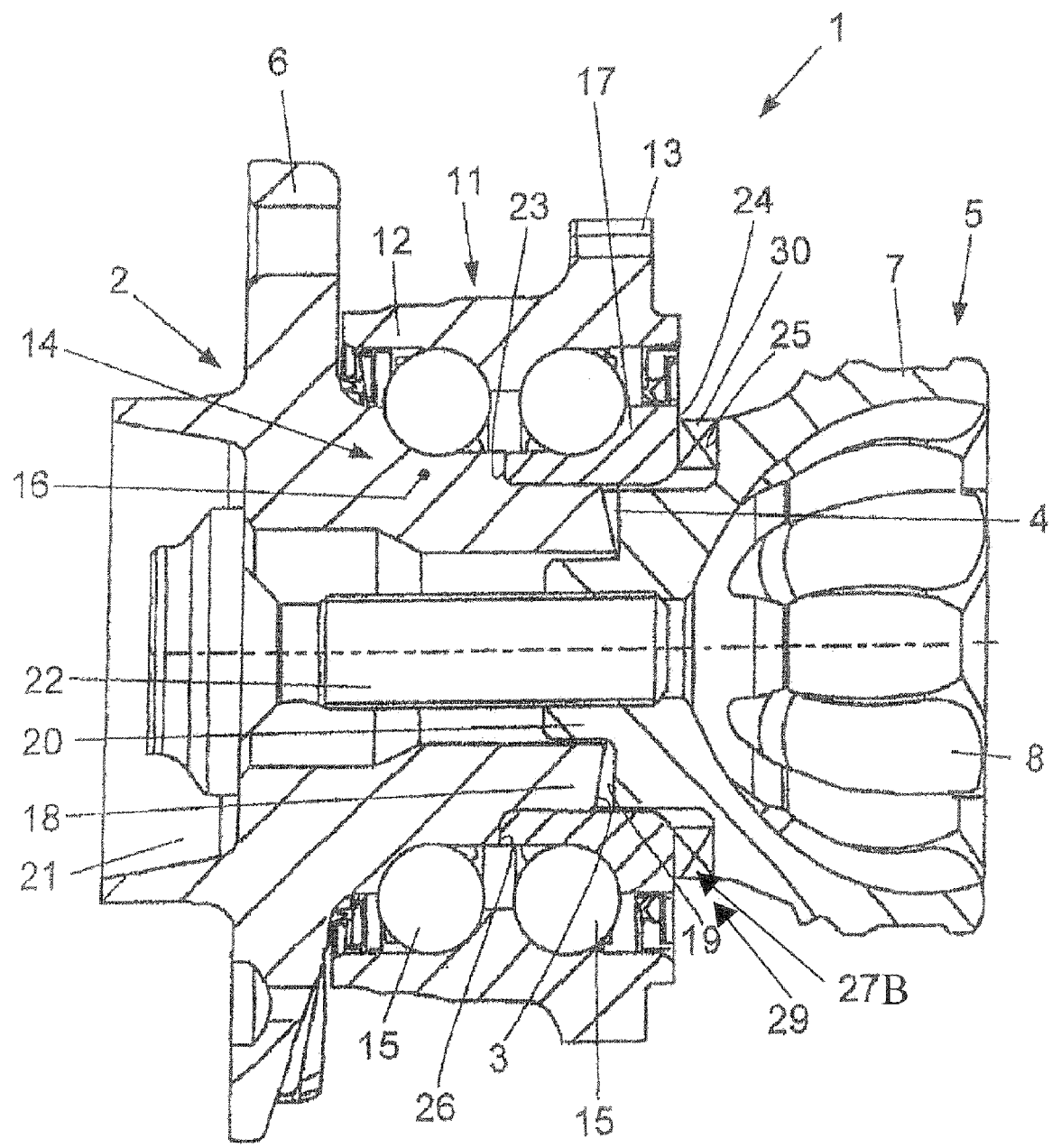
FIG. 2 is a longitudinal section through a second exemplary embodiment of a bearing arrangement according to the invention.

FIG. 2 illustrates a second exemplary embodiment of the bearing arrangement 1 according to the invention corresponding substantially to the arrangement illustrated in FIG. 1. Merely the means 27B for axial tolerance compensation is embodied differently here, that is to say, as a spring element 29 in the form of a shaft washer 30 which is disposed between the counter-surface 25 and the end face 24 of the axially inner bearing inner ring 17. However, instead of the shaft washer 30, it is also possible to use another component made of deformable or resilient material, for example an omega hush known per se or a plate spring.

Figure 3:
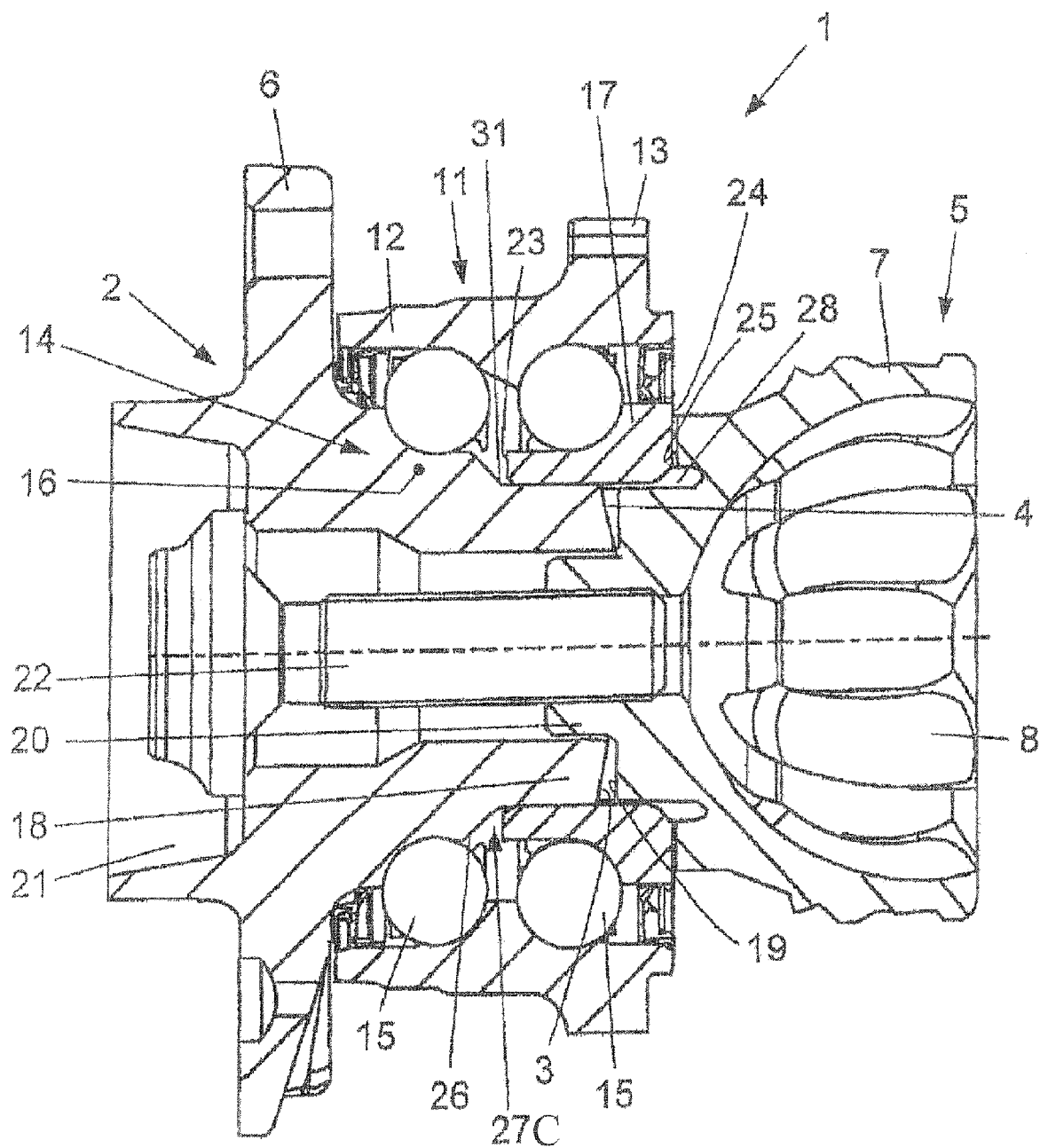
FIG. 3 is a longitudinal section through a third exemplary embodiment of a bearing arrangement according to the invention.

FIG. 3 illustrates a third exemplary embodiment of the bearing arrangement according to the invention corresponding substantially to the arrangement illustrated in FIG. 1. In the case of this embodiment too, an axial undercut, in the form of an annular groove 28 in the counter-surface 25, is introduced into the end face 19 of the joint body 7. In the case of this embodiment, the means 27C for axial tolerance compensation is formed, in addition to the annular groove 28, by an undercut 31, this undercut 31 being shaped into the axle stub 18 in such a way that an axial spacing remains between the axially outer bearing inner ring 16 and the axially outer end face 23 of the inner bearing inner ring 17. By way of the undercut 31, the hearing inner ring 17 can be moved axially freely over a short distance. The required axial play of the bearing arrangement 1 is achieved by way of appropriate pairing of the individual parts or via grinding of the inner raceways in the assembled state.

Figure 4:
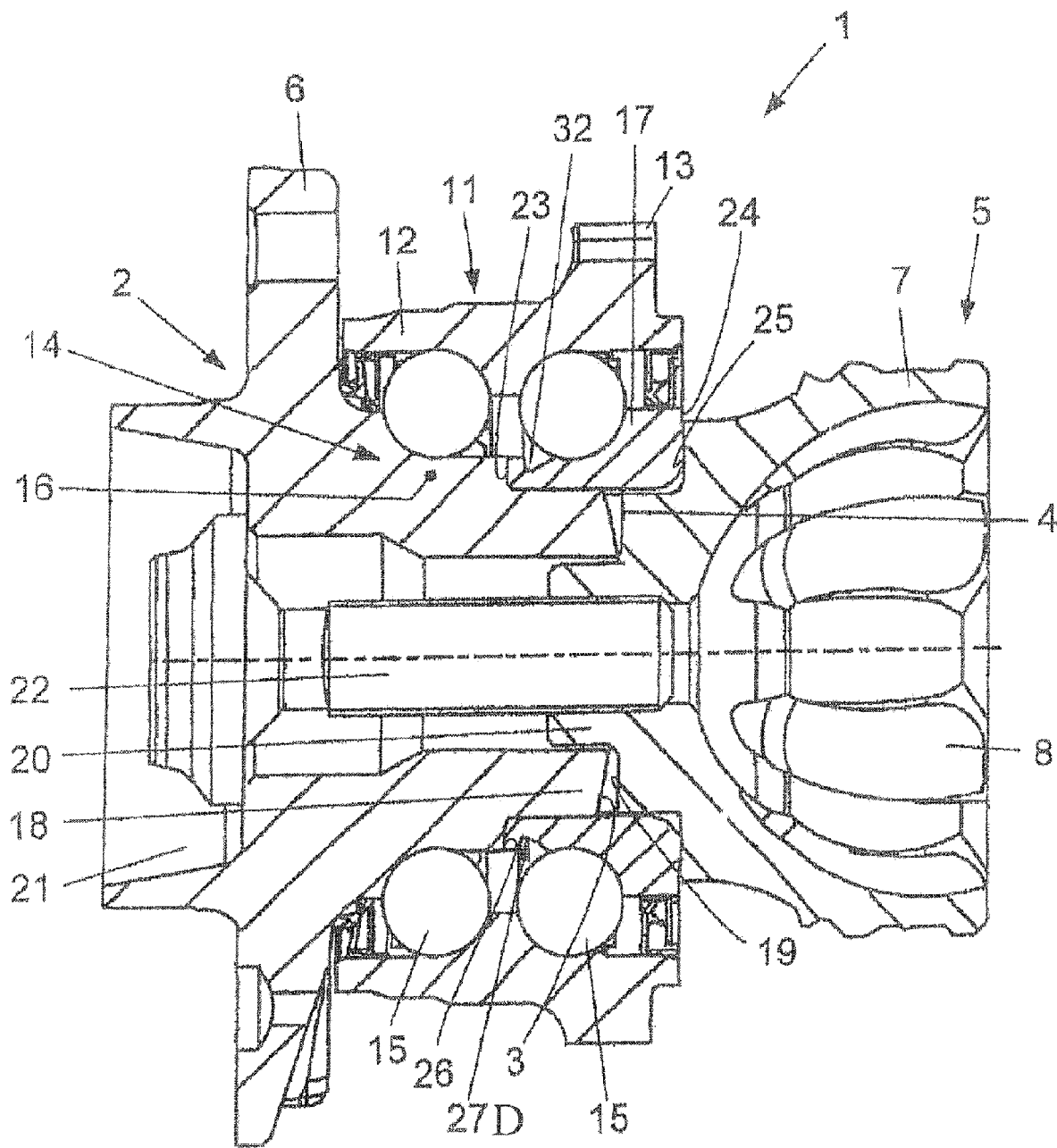
FIG. 4 is a longitudinal section through a fourth exemplary embodiment of a bearing arrangement according to the invention.

FIG. 4 illustrates a fourth exemplary embodiment of the bearing arrangement 1 according to the invention which corresponds substantially to the exemplary embodiments illustrated in FIGS. 1 to 3, but does not have an annular groove in the counter-surface 25 of the joint body 7. The means 27D for axial tolerance compensation is, in the case of this embodiment, formed by a cross-sectional tapering 32 of the axially inner bearing inner ring 17 in the region of its axially outer end face 23. The cross-sectional tapering 32 of the axially inner bearing inner ring 17 is configured in such a way that, during a corresponding application of force by the counter-surface 25 of the joint body 7 onto the axially inner end face 24 of the bearing inner ring 17, a tolerance compensation is ensured by way of the deformation of the bearing inner ring 17. The cross-sectional tapering 32 of the axially inner bearing inner ring 17 acts accordingly as a spring element.

Figure 5:
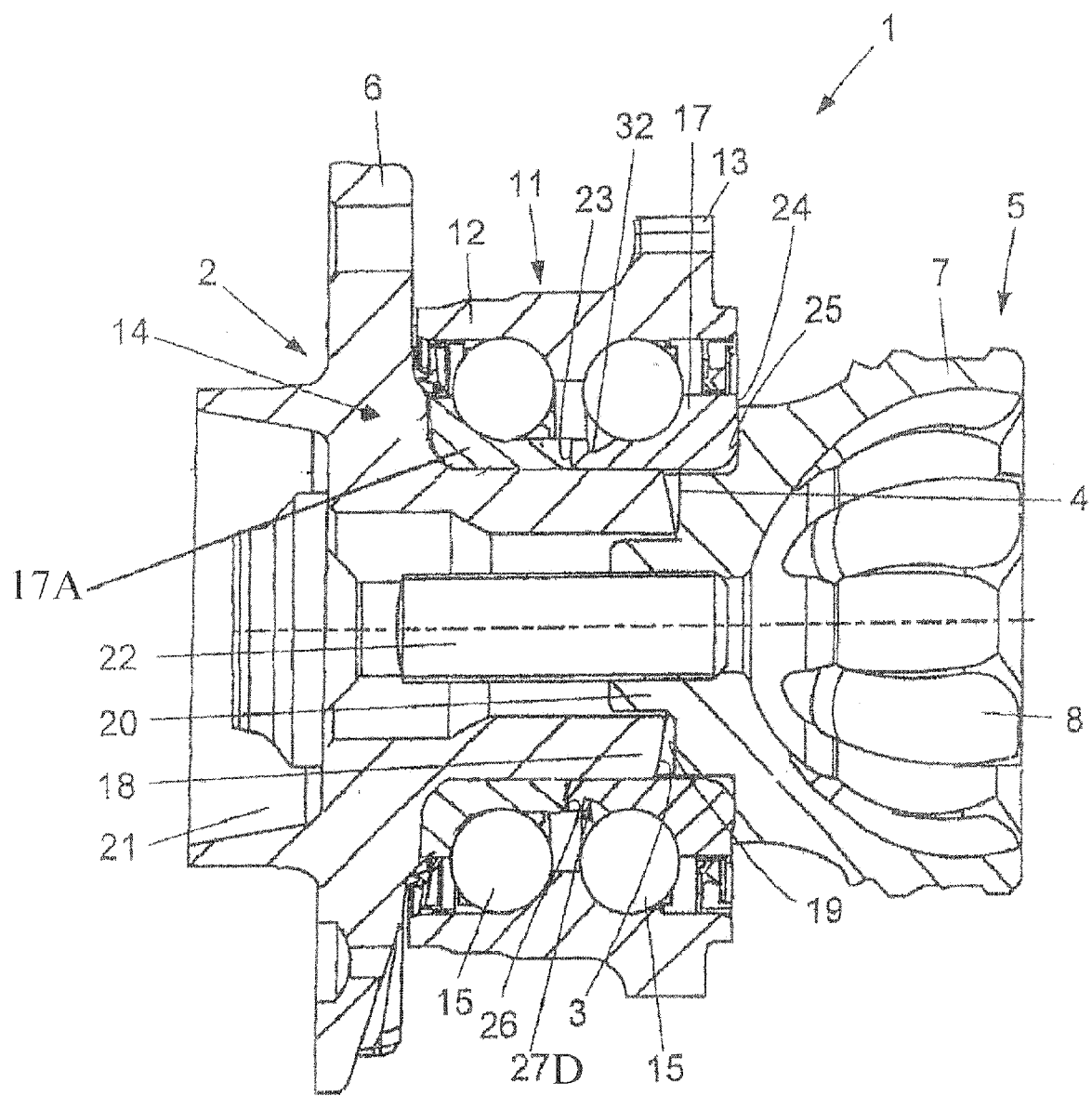
FIG. 5 is a longitudinal section through a fifth exemplary embodiment of a bearing arrangement according to the invention.

FIG. 5 illustrates a fifth exemplary embodiment of the bearing arrangement 1 according to the invention which corresponds substantially to the exemplary embodiments illustrated in FIG. 4, but that comprises a second separate bearing inner ring 17A.

In the case of all five exemplary embodiments, the end serration 3, 4 of the wheel hub 2 and rotating joint 5 is embodied in each case as Hirth serration with radially extending teeth, wherein the number of the teeth is between 40 and 60.

| List of reference numerals | |
| --- | --- |
| 1 | Bearing arrangement |
| 2 | Wheel hub |
| 3 | End serration |
| 4 | End serration |
| 5 | Rotating joint |
| 6 | Wheel flange |
| 7 | Outer joint body |
| 8 | Raceway in the outer joint body |
| 9 | — |
| 10 | — |
| 11 | Roller bearing |
| 12 | Outer ring |

| List of reference numerals | |
|---|---|
| 13 | Fastening flange |
| 14 | Inner ring |
| 15 | Bearing ball |
| 16 | Bearing inner ring |
| 17 | Bearing inner ring |
| 18 | Axle stub |
| 19 | End face |
| 20 | Projection |
| 21 | Hole |
| 22 | Bolt |
| 23 | End face |
| 24 | End face |
| 25 | Counter-surface |
| 26 | Abutment surface |
| 27 | Means |
| 28 | Annular groove |
| 29 | Spring element |
| 30 | Shaft washer |
| 31 | Undercut |
| 32 | Cross-sectional tapering |

The invention claimed is:

1. A bearing arrangement of a wheel hub of a motor vehicle drivable by a rotating joint, wherein the wheel hub, which is connected to a wheel flange, and the rotating joint, which is connected to a drive shaft, are non-rotatably connected to each other by means of a serration, comprising: a double-row roller bearing which is mounted on the wheel hub and has at least one separate bearing inner ring, an end face of which protrudes axially beyond the end of an axle stub of the wheel hub, wherein the roller bearing is axially prestressed via a counter-surface of a joint body of the rotating joint, the surface acting on the end face of the separate bearing inner ring, wherein an end face of the axle stub of the wheel hub comprises an end serration which can be non-rotatably connected to a corresponding end serration of the joint body of the rotating joint, wherein the end serrations are arranged at least partially radially and axially beneath the roller bearing, and in that the bearing inner ring is connected to a means for axial tolerance compensation between the bearing inner ring and the counter-surface of the joint body.

2. The bearing arrangement as claimed in claim 1, wherein the means for axial tolerance compensation between the bearing inner ring and the counter-surface of the joint body is an axial undercut in the form of an annular groove in the end face of the joint body.

3. The bearing arrangement as claimed in claim 1, wherein the means for axial tolerance compensation is a spring element which is arranged between the counter-surface of the joint body and the end face of the bearing inner ring.

4. The bearing arrangement as claimed in claim 3, wherein the spring element is a shaft washer, an omega bush or a plate spring.

5. The bearing arrangement as claimed in claim 1, wherein the means for axial tolerance compensation is formed by an undercut which is formed into the axle stub in such a way that an axial spacing remains between an axially outer bearing inner ring and an axially outer end face of the axially inner bearing inner ring.

6. The bearing arrangement as claimed in claim 5, wherein the means for axial tolerance compensation is formed by a cross-sectional tapering of the axially inner bearing inner ring in the region of its axially outer end face.

7. The bearing arrangement as claimed in claim 1, wherein the end serration is a Hirth serration with radially extending teeth having a number of from 20 to 80.

\* \* \* \* \*